United States Patent
Hveding et al.

(10) Patent No.: US 12,481,081 B2
(45) Date of Patent: *Nov. 25, 2025

(54) DOWNHOLE MONITORING USING FEW-MODE OPTICAL FIBER BASED DISTRIBUTED ACOUSTIC SENSING

(71) Applicants: Saudi Arabian Oil Company, Dhahran (SA); King Abdullah University of Science and Technology, Thuwal (SA)

(72) Inventors: Frode Hveding, Dhahran (SA); Islam Ashry, Thuwal (SA); Mao Yuan, Thuwal (SA); Mohd Sharizal Bin Alias, Thuwal (SA); Boon Siew Ooi, Thuwal (SA); Muhammad Arsalan, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,537

(22) Filed: May 13, 2024

(65) Prior Publication Data
US 2024/0295669 A1 Sep. 5, 2024

Related U.S. Application Data

(63) Continuation of application No. 16/299,918, filed on Mar. 12, 2019, now Pat. No. 12,019,200.

(51) Int. Cl.
*G01V 1/52* (2006.01)
*E21B 47/00* (2012.01)
(Continued)

(52) U.S. Cl.
CPC ............... *G01V 1/52* (2013.01); *E21B 47/00* (2013.01); *G01D 5/268* (2013.01); *G01V 1/50* (2013.01); *G01V 8/16* (2013.01)

(58) Field of Classification Search
CPC ... G01V 1/40; G01V 1/50; G01V 1/52; G01V 1/226; G01V 8/16; E21B 47/00; G01D 5/268; G01H 9/004; H04B 10/2581
See application file for complete search history.

(56) References Cited

U.S. PATENT DOCUMENTS

| | | | |
|---|---|---|---|
| 5,224,182 A | | 6/1993 | Murphy et al. |
| 5,659,568 A | * | 8/1997 | Wang .................. H01S 5/18305 |
| | | | 372/96 |

(Continued)

FOREIGN PATENT DOCUMENTS

| | | |
|---|---|---|
| CN | 101592475 | 12/2009 |
| CN | 103616089 | 3/2014 |

(Continued)

OTHER PUBLICATIONS

G. Yu and et al, "Borehole seismic survey using multimode optical fibers in a hybrid wireline", Measurement, vol. 125, Sep. 1, 2018 (Sep. 1, 2018), pp. 694-703 (Year: 2018).*

(Continued)

*Primary Examiner* — Douglas Kay
(74) *Attorney, Agent, or Firm* — Fish & Richardson P.C.

(57) ABSTRACT

The subject matter of this specification can be embodied in, among other things, a method for removing intermodal distortion that includes receiving a collection of distorted backscattered Rayleigh signals from a collection of modes of an optical fiber, where the collection of distorted backscattered Rayleigh signals are distorted by an intermodal coupling among the collection of modes, receiving a collection of distortion parameters that are descriptive of distortion effects of the intermodal coupling, and determining an undistorted backscattered Rayleigh signal based on the collection of distorted backscattered Rayleigh signals and the collection of distortion parameters.

19 Claims, 6 Drawing Sheets

(51) Int. Cl.
*G01D 5/26* (2006.01)
*G01V 1/50* (2006.01)
*G01V 8/16* (2006.01)

(56) References Cited

U.S. PATENT DOCUMENTS

| | | | |
|---|---|---|---|
| 5,892,860 | A | 4/1999 | Maron et al. |
| 6,193,079 | B1 | 2/2001 | Weimer |
| 6,285,446 | B1 | 9/2001 | Farhadiroushan et al. |
| 6,588,266 | B2 | 7/2003 | Tubel et al. |
| 6,728,165 | B1 | 4/2004 | Roscigno et al. |
| 7,668,411 | B2 | 2/2010 | Davies et al. |
| 8,072,595 | B1 | 12/2011 | Bastiaans |
| 8,493,556 | B2 | 7/2013 | Li et al. |
| 8,947,659 | B1 | 2/2015 | Baastians |
| 8,948,550 | B2 | 2/2015 | Li et al. |
| 9,312,981 | B2 | 4/2016 | Zhou |
| 9,499,460 | B2 | 11/2016 | Kawamura et al. |
| 9,581,489 | B2 | 2/2017 | Skinner |
| 9,599,460 | B2 | 3/2017 | Wang et al. |
| 9,608,762 | B2 | 3/2017 | Zhou |
| 9,617,847 | B2 | 4/2017 | Jaaskelainen et al. |
| 10,378,971 | B2 | 8/2019 | Musin |
| 10,536,238 | B2 | 1/2020 | Shibahara |
| 10,634,553 | B1 | 4/2020 | Hveding et al. |
| 10,962,408 | B2 * | 3/2021 | Hveding ............... G01H 9/004 |
| 11,209,307 | B2 | 12/2021 | Hveding et al. |
| 12,019,200 | B2 * | 6/2024 | Hveding ............ H04B 10/2581 |
| 2001/0036334 | A1 | 11/2001 | Choa |
| 2005/0047779 | A1 | 3/2005 | Jaynes et al. |
| 2008/0231857 | A1 | 9/2008 | Depeursinge |
| 2011/0088462 | A1 | 4/2011 | Samson et al. |
| 2014/0208855 | A1 | 7/2014 | Skinner |
| 2014/0219349 | A1 * | 8/2014 | Chien .................. H04N 19/105 |
| | | | 375/240.12 |
| 2015/0114127 | A1 | 4/2015 | Barfoot et al. |
| 2015/0177300 | A1 | 6/2015 | Paech |
| 2015/0280826 | A1 | 10/2015 | Effenberger |
| 2016/0202142 | A1 | 7/2016 | Wang et al. |
| 2017/0199093 | A1 | 7/2017 | Wang et al. |
| 2017/0219442 | A1 * | 8/2017 | Musin .................... G01K 11/32 |
| 2017/0353241 | A1 | 12/2017 | Fazal et al. |
| 2018/0052041 | A1 | 2/2018 | Yaman et al. |
| 2018/0134036 | A1 | 5/2018 | Galtarossa et al. |
| 2018/0136036 | A1 | 5/2018 | Galtarossa |
| 2018/0375607 | A1 | 12/2018 | Shibahara |
| 2019/0025095 | A1 | 1/2019 | Steel |
| 2021/0372927 | A1 | 12/2021 | Gopinath |

FOREIGN PATENT DOCUMENTS

| | | | |
|---|---|---|---|
| CN | 103913186 | | 7/2014 |
| CN | 104198030 | | 12/2014 |
| CN | 104246448 | | 12/2014 |
| CN | 105021307 | | 11/2015 |
| CN | 105043586 | | 11/2015 |
| CN | 105136337 | | 12/2015 |
| CN | 106895959 | | 6/2017 |
| CN | 107238415 | | 10/2017 |
| CN | 107664541 | | 2/2018 |
| CN | 108534910 | | 9/2018 |
| CN | 207923277 | | 9/2018 |
| EP | 3172545 | B1 * | 9/2018 ............. G01K 11/32 |
| JP | 2007135124 | | 5/2007 |
| JP | 2009042005 | | 2/2009 |
| WO | WO 2013123656 | | 8/2013 |
| WO | WO 2016111849 | | 7/2016 |

OTHER PUBLICATIONS

Z. Wang and et al, "Rayleigh scattering in few-mode optical fibers", Scientific Reports, Published: Oct. 24, 2016, www.nature.com/scientificreports, DOI: 10.1038/srep35844 (Year: 2016).*
J. Xiong and et al, "Crosstalk Suppressed High Efficient Mode-Selective Four-Wave Mixing Through Tailoring Waveguide Geometry", IEEE Photonics Journal, vol. 11, No. 1, Feb. 2019 (Year: 2019).*
H. Hartog and et al, "Advances in distributed fiber-optic sensing for monitoring marine infrastructure, measuring the deep ocean, and quantifying the risks posed by seafloor hazards", Marine Technology Society Journal 52, No. 5 (2018): 58-73 (Year: 2018).*
International Search Report and Written Opinion in International Appln. No. PCT/US2020/015347, May 8, 2020, 13 pages.
PCT International Search Report and Written Opinion in International Appln. No. PCT/US2020/021717, dated Jul. 16, 2020, 19 pages.
SAIP Examination Report in SAIP Appln. No. 521422657, dated Dec. 29, 2022, 5 pages.
SAIP Examination Report in SAIP Appln. No. 521430270, dated Dec. 28, 2022, 8 pages.
CN Office Action in Chinese Appln. No. 202080011654.8, dated Sep. 20, 2023, 40 pages (with English translation).
CN Office Action in Chinese Appln. No. 202080020480.1, dated Oct. 10, 2023, 25 pages (with English translation).
GCC Examination Report in GCC Appln. No. GC 2020-39087, dated Jun. 2, 2021, 3 pages.
GCC Examination Report in GCC Appln. No. GC 2020-39342, dated Dec. 14, 2021, 4 pages.
Bao and L. Chen, "Recent Progress in Distributed Fiber Optic Sensors", Sensors 2012, 12, 8601-8639; doi:10.3390/s120708601 (Year: 2012).
Bhoja and et al, "An Overview of Electronic Dispersion Compensation Techniques for 10-Gbit/s over FDDI Grade MMF", IEEE 802.3 Interim Meeting Vancouver, BC, Canada, Jan. 2004.
Wang and et al, "Rayleigh scattering in few-mode optical fibers", Scientific Reports, Published: Oct. 24, 2016.
Weem and et al, "Electronic dispersion compensation for 10 Gigabit communication links over FDDI legacy multimode fiber", OFC/NFOEC Technical Digest. Optical Fiber Communication Conference, 2005.
Xiong and et al, Crosstalk Suppressed High Efficient Mode-Selective Four-Wave Mixing Through Tailoring Waveguide Geometry, IEEE Photonics Journal, vol. 11, No. 1, Feb. 2019.
Y. Wang and et al, "Real-Time Distributed Vibration Monitoring System Using (1)-OTDR", IEEE Sensors Journal, vol. 17, No. 5, Mar. 1, 2017 (Year: 2017).
Yu et al., "Borehole seismic survey using multimode optical fibers in a hybrid wireline," Measurement, Sep. 2018, 125:694-703.
Belal, Mohammad. "Advances in distributed fiber-optic sensing for monitoring marine infrastructure, measuring the deep ocean, and quantifying the risks posed by seafloor hazards", Marine Technology Society Journal 52, No. 5 (2018): 58-73 (Year: 2018).
Cuiguang et al., "Measurement of Mode Coupling in Few-Mode Fiber Based on Rayleigh Backscattering," Chinese Journal of Lasers, Aug. 2017, 44:8, 7 pages.
CN Notification of Grant of Invention Patent in Chinese Appln. No. 202080020480.1, dated Aug. 19, 2024, 7 pages (with English Translation).

* cited by examiner

DOWNHOLE MONITORING USING FEW-MODE OPTICAL FIBER BASED DISTRIBUTED ACOUSTIC SENSING

CROSS-REFERENCE TO RELATED PATENT APPLICATIONS

This application is a continuation of and claims the benefit of priority to U.S. patent application Ser. No. 16/299,918 filed on Mar. 12, 2019, the contents of which are incorporated by reference herein.

TECHNICAL FIELD

This instant specification relates to optical fiber vibration sensors.

BACKGROUND

Among existing approaches for distributed sensing, the fiber optic paradigm is particularly unique given its numerous advantages including immunity to electromagnetic interference, miniature sizes, harsh environment operation, and capability of large-scale multiplexing.

One application is an optical fiber distributed acoustic sensor (DAS) designed using phase-sensitive optical time domain reflectometry (Φ-OTDR). The Φ-OTDR based DAS has been deployed in applications such as real time structural health monitoring, oil and gas industry, and aerospace transportation. Its operation principle consists of launching a train of optical pulses, generated by a narrow linewidth laser, into the fiber under test (FUT). At the FUT input port, consecutive Rayleigh backscattered traces are recorded in the time domain. Each Rayleigh trace has a speckle-like profile because of coherent interference of the signals reflected by scattering centers within the injected pulse duration. In the absence of intrusion along the FUT (such as no refractive index perturbation), the recorded Rayleigh traces are ideally identical. When an acoustic signal is applied at a position along the FUT, the effective refractive index changes at this position, and consequently the intrusion can be sensed by observing the intensity fluctuation of a corresponding speckle in the recorded traces.

SUMMARY

In general, this document describes techniques and systems for optical fiber vibration sensing for downhole monitoring.

In a first aspect, a method for removing intermodal distortion includes receiving a collection of distorted backscattered Rayleigh signals from a collection of modes of an optical fiber, where the collection of distorted backscattered Rayleigh signals are distorted by an intermodal coupling among the collection of modes, receiving a collection of distortion parameters that are descriptive of distortion effects of the intermodal coupling, and determining an undistorted backscattered Rayleigh signal based on the collection of distorted backscattered Rayleigh signals and the collection of distortion parameters.

Various implementations can include some, all, or none of the following features. The method can also include determining at least one transformed Rayleigh signal by removing distortion caused by intermodal coupling from at least one of the distorted backscattered Rayleigh signals, based on the distorted backscattered Rayleigh signals and the collection of distortion parameters, where the collection of distorted backscattered Rayleigh signals are backscattered by a vibration of the optical fiber at a vibration frequency and a vibration amplitude at a vibration location along the optical fiber, determining, based on the transformed Rayleigh signal, at least one of the vibration location, the vibration frequency, and the vibration amplitude, and providing the determined at least one of the vibration location, the vibration frequency, and the vibration amplitude. Receiving a collection of distortion parameters that are descriptive of distortion effects of the intermodal coupling includes transmitting a collection of training symbols as a collection of optical pulses through the optical fiber, receiving a collection of training backscattered Rayleigh signals from the collection of modes of the optical fiber, where the collection of training backscattered Rayleigh signals are distorted by the intermodal coupling among the collection of modes, comparing the collection of received training backscattered Rayleigh signals to a collection of predetermined undistorted backscattered Rayleigh signals, determining, based on the comparing, a collection of determined distortion parameters, and providing the collection of determined distortion parameters as the collection of distortion parameters. Receiving a collection of distortion parameters that are descriptive of distortion effects of the intermodal coupling can include receiving a collection of first distortion parameters, transmitting a collection of optical pulses through the optical fiber, measuring the received collection of distorted backscattered Rayleigh signals, determining, based on the measuring, a collection of second distortion parameters, and providing the collection of second distortion parameters as the collection of distortion parameters that are descriptive of distortion effects of the intermodal coupling. The method can also include transmitting a collection of optical pulses through a selected mode of an optical fiber, where receiving a collection of distorted backscattered Rayleigh signals from a collection of modes of an optical fiber, where the collection of distorted backscattered Rayleigh signals are distorted by an intermodal coupling among the collection of modes includes separating, by a mode demultiplexer, first backscattered Rayleigh signals from a selected mode A of the optical fiber based on a vibration of the optical fiber at a vibration frequency and a vibration amplitude at a vibration location along the optical fiber, and separating, by the mode demultiplexer, second backscattered Rayleigh signals from another selected mode B of the optical fiber based on the vibration of the optical fiber. The method can also include comparing the first backscattered Rayleigh signals and the second backscattered Rayleigh signals, and determining, based on the comparing, an amount of intermodal coupling between the mode A and the mode B. The method can also include detecting differences between the first backscattered Rayleigh signals and the second backscattered Rayleigh signals. The method can also include applying a Fourier transform to the first backscattered Rayleigh signals and the second backscattered Rayleigh signals. Receiving a collection of distorted backscattered Rayleigh signals from a collection of modes of an optical fiber, where the collection of distorted backscattered Rayleigh signals are distorted by an intermodal coupling among the collection of modes can include receiving a first distorted backscattered Rayleigh signal $S_1$ from a mode 1 of the optical fiber, receiving a second distorted backscattered Rayleigh signal $S_2$ from a mode 2 of the optical fiber, and receiving a third distorted backscattered Rayleigh signal $S_N$ from a mode N of the optical fiber, receiving a collection of distortion parameters that are descriptive of distortion effects of the intermodal coupling also includes receiving a distortion parameter $a_{11}$, receiving a distortion parameter $a_{12}$, and receiving a distortion parameter $a_{NN}$, determining an undistorted backscattered Rayleigh signal based on the collection of distorted backscattered Rayleigh signals and the collection of distortion parameters includes determining a first undistorted Rayleigh signal $S_{1o}$ of the mode 1, determining a second undistorted Rayleigh signal $S_{2o}$ of the mode 2, and determining a third undistorted Rayleigh signal $S_{No}$ of the mode N, where $S_{1o}$, $S_{2o}$, and $S_{No}$ are determined as $$\begin{bmatrix} S_{1o} \\ S_{2o} \\ \cdots \\ S_{No} \end{bmatrix} = \begin{bmatrix} a_{11} & a_{12} & \cdots & a_{1N} \\ a_{21} & a_{22} & \cdots & a_{2N} \\ \cdots & \cdots & \cdots & \cdots \\ a_{N1} & a_{N2} & \cdots & a_{NN} \end{bmatrix}^{-1} \begin{bmatrix} S_1 \\ S_2 \\ \cdots \\ S_N \end{bmatrix}.$$

The optical fiber can be a few mode fiber (FMF).

In a second aspect, a non-transitory computer storage medium encoded with a computer program, the program including instructions that when executed by data processing apparatus cause the data processing apparatus to perform operations including receiving a collection of distorted backscattered Rayleigh signals from a collection of modes of an optical fiber, where the collection of distorted backscattered Rayleigh signals are distorted by an intermodal coupling among the collection of modes, receiving a collection of distortion parameters that are descriptive of distortion effects of the intermodal coupling, and determining an undistorted backscattered Rayleigh signal based on the collection of distorted backscattered Rayleigh signals and the collection of distortion parameters.

Various embodiments can include some, all, or none of the following features. The operations can also include determining at least one transformed Rayleigh signal by removing distortion caused by intermodal coupling from at least one of the distorted backscattered Rayleigh signals, based on the distorted backscattered Rayleigh signals and the collection of distortion parameters, where the collection of distorted backscattered Rayleigh signals are backscattered by a vibration of the optical fiber at a vibration frequency and a vibration amplitude at a vibration location along the optical fiber, determining, based on the transformed Rayleigh signal, at least one of the vibration location, the vibration frequency, and the vibration amplitude, and providing the determined at least one of the vibration location, the vibration frequency, and the vibration amplitude. Receiving a collection of distortion parameters that are descriptive of distortion effects of the intermodal coupling can include transmitting a collection of training symbols as a collection of optical pulses through the optical fiber, receiving a collection of training backscattered Rayleigh signals from the collection of modes of the optical fiber, where the collection of training backscattered Rayleigh signals are distorted by the intermodal coupling among the collection of modes, comparing the collection of received training backscattered Rayleigh signals to a collection of predetermined undistorted backscattered Rayleigh signals, determining, based on the comparing, a collection of determined distortion parameters, and providing the collection of determined distortion parameters as the collection of distortion parameters. Receiving a collection of distortion parameters that are descriptive of distortion effects of the intermodal coupling can include receiving a collection of first distortion parameters, transmitting a collection of optical pulses through the optical fiber, measuring the received collection of distorted backscattered Rayleigh signals, determining, based on the measuring, a collection of second distortion parameters, and providing the collection of second distortion parameters as the collection of distortion parameters that are descriptive of distortion effects of the intermodal coupling. The operations can also include transmitting a collection of optical pulses through a selected mode of an optical fiber, where receiving a collection of distorted backscattered Rayleigh signals from a collection of modes of an optical fiber, where the collection of distorted backscattered Rayleigh signals are distorted by an intermodal coupling among the collection of modes can include separating, by a mode demultiplexer, first backscattered Rayleigh signals from a selected mode A of the optical fiber based on a vibration of the optical fiber at a vibration frequency and a vibration amplitude at a vibration location along the optical fiber, and separating, by the mode demultiplexer, second backscattered Rayleigh signals from a selected mode B of the optical fiber based on the vibration of the optical fiber. The operations can also include comparing the first backscattered Rayleigh signals and the second backscattered Rayleigh signals, and determining, based on the comparing, an amount of intermodal coupling between the mode A and the mode B. The operations can also include detecting differences between the first backscattered Rayleigh signals and the second backscattered Rayleigh signals. The operations can also include applying a Fourier transform to the first backscattered Rayleigh signals and the second backscattered Rayleigh signals. The operations can also include receiving a collection of distorted backscattered Rayleigh signals from a collection of modes of an optical fiber, where the collection of distorted backscattered Rayleigh signals are distorted by an intermodal coupling among the collection of modes can include receiving a first distorted backscattered Rayleigh signal $S_1$ from a mode 1 of the optical fiber, receiving a second distorted backscattered Rayleigh signal $S_2$ from a mode 2 of the optical fiber, and receiving a third distorted backscattered Rayleigh signal $S_N$ from a mode N of the optical fiber, receiving a collection of distortion parameters that are descriptive of distortion effects of the intermodal coupling can also include receiving a distortion parameter $a_{11}$, receiving a distortion parameter $a_{12}$, and receiving a distortion parameter $a_{NN}$, determining an undistorted backscattered Rayleigh signal based on the collection of distorted backscattered Rayleigh signals and the collection of distortion parameters can include determining a first undistorted Rayleigh signal $S_{1o}$ of the mode 1, determining a second undistorted Rayleigh signal $S_{2o}$ of the mode 2, and determining a third undistorted Rayleigh signal $S_{No}$ of the mode N, where $S_{1o}$, $S_{2o}$, and $S_{No}$ are determined as $$\begin{bmatrix} S_{1o} \\ S_{2o} \\ \cdots \\ S_{No} \end{bmatrix} = \begin{bmatrix} a_{11} & a_{12} & \cdots & a_{1N} \\ a_{21} & a_{22} & \cdots & a_{2N} \\ \cdots & \cdots & \cdots & \cdots \\ a_{N1} & a_{N2} & \cdots & a_{NN} \end{bmatrix}^{-1} \begin{bmatrix} S_1 \\ S_2 \\ \cdots \\ S_N \end{bmatrix}.$$

The optical fiber can be a few mode fiber (FMF).

In a third aspect, a vibration sensor system includes a light pulse generator configured to provide a collection of optical pulses, a few mode optical fiber having a predetermined length and configured to guide the optical pulses, a sensor configured to determine a location and frequency of a vibration of the optical fiber at a location along the optical fiber, based on a collection of distortion parameters representative of distortion of backscattered Rayleigh signals caused by intermodal coupling within the few mode optical fiber.

Various embodiments can include some, all, or none of the following features. The light pulse generator can include a light source configured to generate continuous-wave light, a first optical modulator configured to convert the continuous-wave light into the collection of optical pulses having a predetermined frequency, an optical amplifier configured to amplify the collection of optical pulses, and an optical circulator having a first port configured to receive the optical pulses and provide the optical pulses to a second port that is optically coupled to the optical fiber, where the second port is also configured to receive backscattered Rayleigh traces and provide the backscattered Rayleigh traces to a third port that is in optical communication with the sensor. The system can also include a non-transitory computer storage medium encoded with a computer program, the program including instructions that when executed by data processing apparatus cause the data processing apparatus to perform operations including receiving a collection of distorted backscattered Rayleigh signals from a collection of modes of an optical fiber, where the collection of distorted backscattered Rayleigh signals are distorted by an intermodal coupling among the collection of modes, receiving a collection of distortion parameters that are descriptive of distortion effects of the intermodal coupling, and determining an undistorted backscattered Rayleigh signal based on the collection of distorted backscattered Rayleigh signals and the collection of distortion parameters. Receiving a collection of distortion parameters that are descriptive of distortion effects of the intermodal coupling can include transmitting a collection of training symbols as a collection of optical pulses through the optical fiber, receiving a collection of training backscattered Rayleigh signals from the collection of modes of the optical fiber, where the collection of training backscattered Rayleigh signals are distorted by the intermodal coupling among the collection of modes, comparing the collection of received training backscattered Rayleigh signals to a collection of predetermined undistorted backscattered Rayleigh signals, determining, based on the comparing, a collection of determined distortion parameters, and providing the collection of determined distortion parameters as the collection of distortion parameters. Receiving a collection of distortion parameters that are descriptive of distortion effects of the intermodal coupling can include receiving a collection of first distortion parameters, transmitting a collection of optical pulses through the optical fiber, measuring the received collection of distorted backscattered Rayleigh signals, determining, based on the measuring, a collection of second distortion parameters, and providing the collection of second distortion parameters as the collection of distortion parameters that are descriptive of distortion effects of the intermodal coupling. Receiving a collection of distorted backscattered Rayleigh signals from a collection of modes of an optical fiber, where the collection of distorted backscattered Rayleigh signals are distorted by an intermodal coupling among the collection of modes can include receiving a first distorted backscattered Rayleigh signal $S_1$ from a mode 1 of the optical fiber, receiving a second distorted backscattered Rayleigh signal $S_2$ from a mode 2 of the optical fiber, and receiving a third distorted backscattered Rayleigh signal $S_N$ from a mode N of the optical fiber, receiving a collection of distortion parameters that are descriptive of distortion effects of the intermodal coupling further can include receiving a distortion parameter $a_{11}$, receiving a distortion parameter $a_{12}$, and receiving a distortion parameter $a_{NN}$, determining an undistorted backscattered Rayleigh signal based on the collection of distorted backscattered Rayleigh signals and the collection of distortion parameters can include determining a first undistorted Rayleigh signal $S_{1o}$ of the mode 1, determining a second undistorted Rayleigh signal $S_{2o}$ of the mode 2, and determining a third undistorted Rayleigh signal $S_{No}$ of the mode N, where $S_{1o}$, $S_{2o}$, and $S_{No}$ can be determined as $$\begin{bmatrix} S_{1o} \\ S_{2o} \\ \dots \\ S_{No} \end{bmatrix} = \begin{bmatrix} a_{11} & a_{12} & \dots & a_{1N} \\ a_{21} & a_{22} & \dots & a_{2N} \\ \dots & \dots & \dots & \dots \\ a_{N1} & a_{N2} & \dots & a_{NN} \end{bmatrix}^{-1} \begin{bmatrix} S_1 \\ S_2 \\ \dots \\ S_N \end{bmatrix}.$$

The systems and techniques described here may provide one or more of the following advantages. First, a system can improve the sensing range and spatial resolution of distributed optical fiber acoustic/vibration sensors for downhole monitoring. Second, the system can improve the signal-to-noise ratio (SNR) of the Rayleigh backscattered traces since increased power can be launched into the few mode fiber (FMF) compared with the standard single mode fiber (SMF). Third, the system would allow sensing multiple parameters along with the acoustic/vibration signals.

The details of one or more implementations are set forth in the accompanying drawings and the description that will be provided in subsequent paragraphs. Other features and advantages will be apparent from the description and drawings, and from the claims.

DETAILED DESCRIPTION

Figure 1:
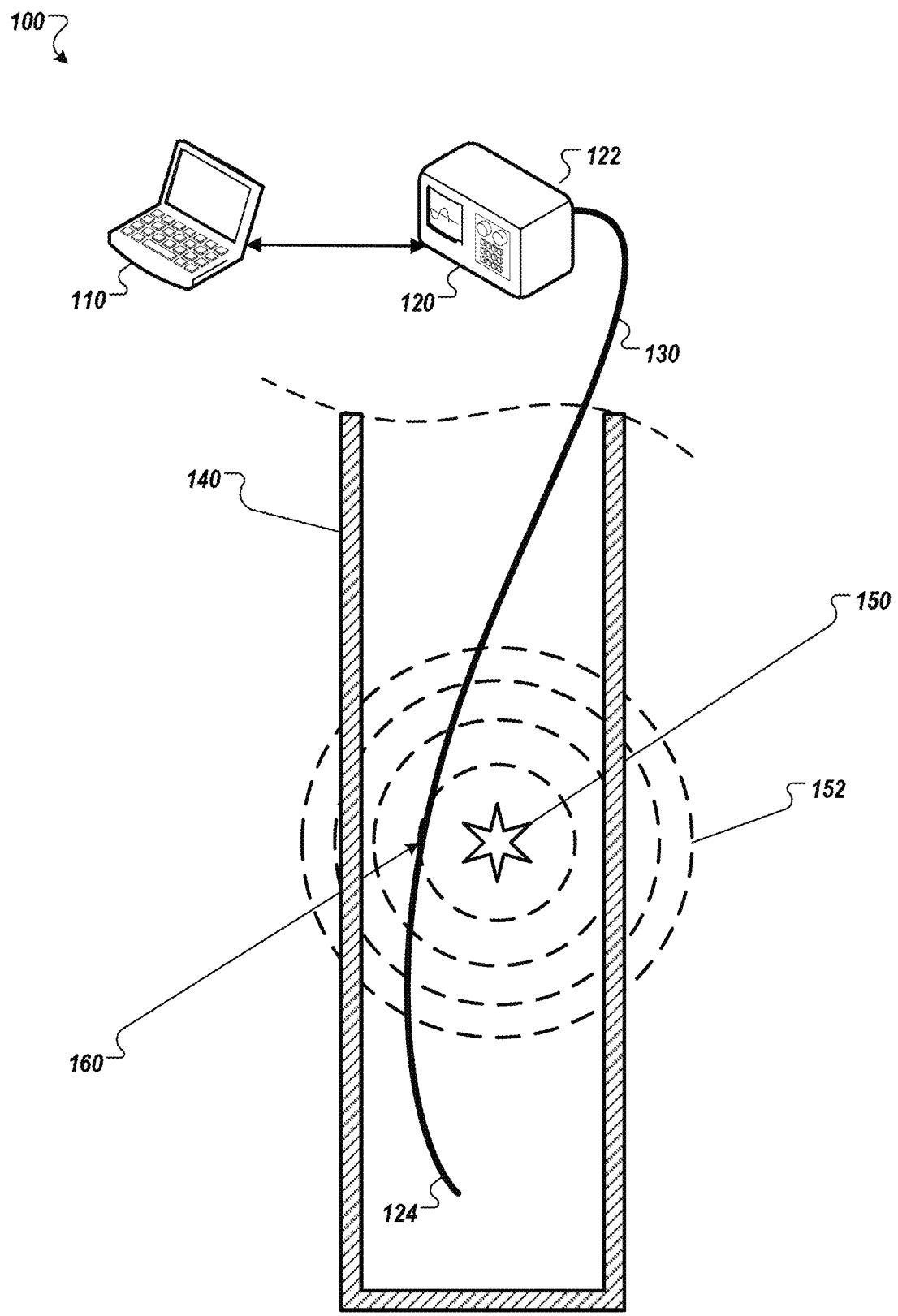
FIG. 1 is a schematic diagram that shows an example of a system for downhole monitoring using few-mode optical fiber based vibration sensor.

This document describes systems and techniques for downhole monitoring using few-mode optical fiber based vibration sensor. Optical fiber sensors are particularly attractive since they have numerous advantages including harsh environment operation, immunity to electromagnetic interference, and miniature sizes. One potential example of them is the distributed acoustic sensor (DAS) designed using the phase-sensitive optical time domain reflectometry (Φ-OTDR). The Φ-OTDR based DAS has been utilized in many applications such as oil and gas industry, real-time structural health monitoring, and aerospace transportation, among others. Briefly, its underlying operation concept relies on using a coherent (narrow linewidth) laser source to launch optical pulses into a fiber. While a pulse is propagating along the fiber, a Rayleigh trace is backscattered to be recorded at the fiber input port. By monitoring the intensity temporal evolution of the recorded Rayleigh traces, one can figure out a position along the fiber where subject to vibration and also the vibration amplitude and frequency.

Single-mode fiber (SMF), which only supports the fundamental mode, is a widely used platform for the Φ-OTDR based DAS. In this case, Rayleigh traces are a result of scattering and interference of only one mode, which offers high system signal-to-noise ratio (SNR). In other words, Rayleigh traces are relatively stable in the time domain. However, use of SMF is not recommended when designing DAS system for long sensing range and small spatial resolution. This is because the proper use of SMF systems requires launching narrow width pulses with input power that exceeds the nonlinearity threshold of SMF. As a result, the input power would be rapidly depleted by the stimulated Raman scattering, which is the dominant source of nonlinearity in meter-scale spatial resolution system.

As an alternative solution, multimode fiber (MMF) characterized by a predetermined threshold of nonlinearity can be deployed instead of SMF. The typical MMF supports propagating hundreds of modes, and each mode has its own interference behavior. Additionally, intermodal coupling within MMF is rapid in that power is transferred among modes within a short distance. Moreover, especially for long sensing range, MMF suffers intermodal dispersion. As a result, MMF-based DAS system is noisy and typically requires sophisticated filtering techniques before recording Rayleigh signals.

As a solution to the challenges of SMF and MMF based DAS, Φ-OTDR based DAS systems using few-mode-fiber (FMF) can be implemented. In contrast to MMF, FMF guides a restricted number of spatial modes, typically less than 20 modes, such that intermodal coupling and differential mode group delays within the FMF can controlled and managed. Furthermore, one can use a mode multiplexer/demultiplexer (MUX/DEMUX) to launch and extract individual modes into and from a FMF easily. Use of FMF has several advantages compared to SMF and MMF, such as the power threshold of nonlinearity of FMF is greater than that of the SMF, which offers longer sensing range with smaller spatial resolution, and by appropriate design of FMF and because its number of modes is limited, the impact of intermodal coupling and dispersion could be significantly reduced in comparison to MMF.

FIG. 1 is a schematic diagram that shows an example of a system 100 for downhole monitoring using few-mode optical fiber based vibration sensor. The system 100 is a phase-sensitive optical time domain reflectometry (Φ-OTDR) based optical fiber distributed acoustic sensor (DAS) system that includes a computing system 110, a sensor system 120, and a fiber under test (FUT) 130. The computing system 110 is in electronic communication with the sensor system 120 (such as through a network connection or a universal serial bus connection).

The FUT 130 is an optical fiber that is optically coupled to the sensor system 120 at a proximal end 122 and extends a distance (multiple kilometers, for example) to a distal end 124. The FUT 130 can be extended in oil/gas well 140. In the illustrated example, a vibration source 150 emits vibrations 152 at a particular frequency. The vibrations 152 intersect the FUT 130 and vibrate the FUT 130 at, near, or around a location 160.

The system 100 uses a technique that improves the sensitivity, resolution, or both, of a phase-sensitive optical time domain reflectometry (Φ-OTDR) based optical fiber distributed acoustic sensor (DAS) system. In general, and as will be discussed in more detail later, multiple modes of the FUT 130 can be used, and intermodal distortion within the Rayleigh signals that are backscattered on the modes can be reduced or removed to improve system performance for sensing the location, frequency, and amplitude of vibration(s) along the FUT 130.

Figure 2A:
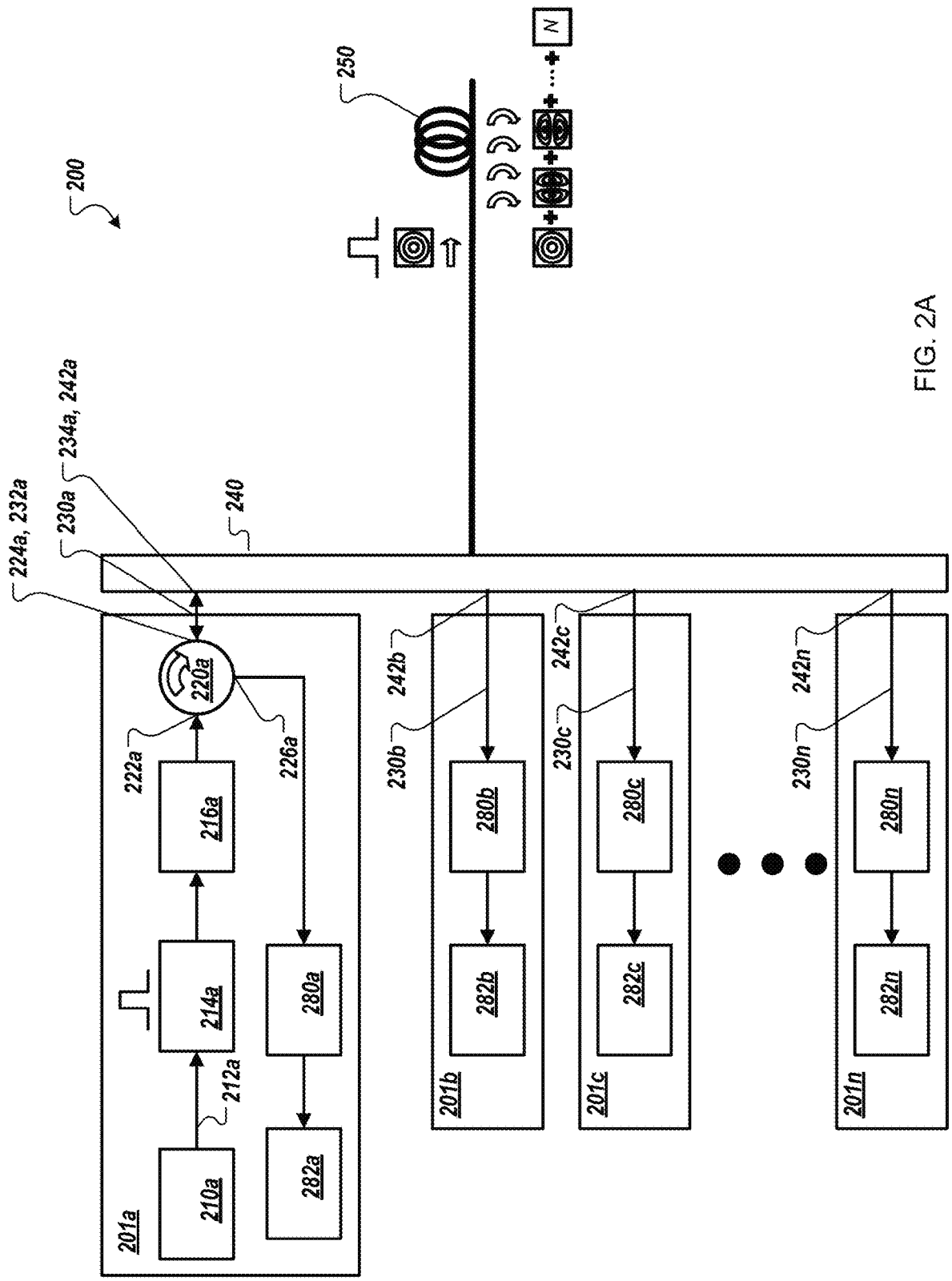
FIGS. 2A and 2B are block diagrams that show an example of a system for remotely sensing vibration.

FIG. 2A is a block diagram that shows an example of a system 200 for remotely sensing vibration. In some implementations, the system 200 can be the example system 100 of FIG. 1.

The system 200 includes a light pulse assembly 201a. A light source 210a of the light pulse assembly 201a emits light into a single mode fiber (SMF) 212a. In the illustrated example, the light source 210a is a narrow-linewidth (1 kiloHertz (kHz), for example) laser source that generates continuous-wave (CW) light. The laser light is modulated by a modulator 214a to produce optical pulses.

The modulated light is amplified by an optical amplifier 216a. The amplified modulated light is provided to an optical port 222a of an optical circulator 220a. The optical circulator 220a provides the amplified modulated light to an optical port 224a that is optically coupled to a proximal end 232a of a single mode fiber 230a. In some embodiments (for example, in which the laser power is sufficiently high), the optical amplifier 216a may be omitted.

A distal end 234a of the single mode fiber 230a is optically coupled to an optical port 242a of a mode multiplexer (MUX) 240. The mode multiplexer 240 is an optical coupler that allows several standard single mode optical fiber inputs to be selectively converted into the individual modes of a few mode fiber (FMF) 250. In the illustrated example, mode multiplexer 240 is configured to couple the optical port 242a to mode 1 (mode one, mode A) of the few mode fiber 250. In other examples, other ports of the mode multiplexer 240 can be used, such that light pulses can be launched into any appropriate mode of the few mode fiber 250, an example of which will be discussed in the description of FIG. 2B.

In this document, the term "multiplexer" can also include bidirectional mode multiplexer/demultiplexers (MUX/DEMUX). In the illustrated example, the mode multiplexer 240 is also a mode demultiplexer that allows individual modes of a few mode fiber at an optical fiber input to be selectively converted into the individual single mode optical fibers. In some embodiments, a device that is configured to perform only mode multiplexing may be used in substantially parallel with a device that is configured to perform only mode demultiplexing (for example, mode multiplexing and demultiplexing can occur at the same time in two separate devices, or the two processes can be performed at different times such as the amount of time it would take for a multiplexed pulse to be injected and then backscattered to the demultiplexer).

In the illustrated example, the few mode fiber 250 is several kilometers (km) long (such as 4 km), but this is just one example. In various implementations, any appropriate length of fiber can be used. In some implementations, the few mode fiber 250 can be strung along a region to be monitored and vibrations from sources can be monitored along a region near the few mode fiber 250. For example, the few mode fiber 250 could be extended in buildings, oil/gas wells, or industrial sites to sense vibrations, which might be produced by structural cracks, oil/gas flows, or human/machines activities.

As a launched pulse propagates within the few mode fiber 250, part of its power is backscattered by the optical phenomena such as Rayleigh scattering. When photons are scattered from an atom or molecule, most of them are elastically scattered (Rayleigh scattering).

The backscattered Rayleigh signal is directed by the few mode fiber 250 to the mode multiplexer 240. Depending on the mode of the few mode fiber 250 that carries the backscattered signal, the mode multiplexer 240 directs the backscattered signal to the optical port 242a or another one of a collection of optical ports 242b-242n. In the illustrated example, since the optical pulses were directed to mode 1 (one) of the few mode fiber 250, then most of the backscattered Rayleigh signals will be returned though mode 1, and as such, the backscattered signals will be demultiplexed to the optical port 242a and the single mode fiber 230a.

The remaining backscattered Rayleigh signals guided by other modes of the few mode fiber 250 will be directed to other ports of the mode multiplexer 240. Signals backscattered on mode 2 are demultiplexed to the optical port 242b and guided to a light pulse assembly 201b by a single mode fiber 230b. Signals backscattered on mode 3 are demultiplexed to the optical port 242c and guided to a light pulse assembly 201c by a single mode fiber 230c. Signals backscattered on mode N are demultiplexed to the optical port 242n and guided to a light pulse assembly 201n by a single mode fiber 230n.

To analyze the backscattered Rayleigh signal on mode 1 (one), the Rayleigh signals are directed by the optical circulator 220a to an optical port 226a that is optically coupled to a receiver 280a for amplification, detection, and data acquisition. Finally, a signal processor 282a (such as a computer, an oscilloscope) processes the acquired Rayleigh data and provides information that describes the distribution of vibration locations, amplitudes, and frequencies along the few mode fiber 250.

To analyze the backscattered Rayleigh signal on mode 2 (mode two, mode B), the Rayleigh signals are directed by the mode multiplexer 240 a receiver 280b for amplification, detection, and data acquisition. A signal processor 282b (such as a computer, an oscilloscope) processes the acquired Rayleigh data and provides information that describes the distribution of vibration locations, amplitudes, and frequencies along the few mode fiber 250. To analyze the backscattered Rayleigh signal on mode 3 (three), the Rayleigh signals are directed by the mode multiplexer 240 a receiver 280c for amplification, detection, and data acquisition. A signal processor 282c (such as a computer, an oscilloscope) processes the acquired Rayleigh data and provides information that describes the distribution of vibration locations, amplitudes, and frequencies along the few mode fiber 250. To analyze the backscattered Rayleigh signal on mode N, the Rayleigh signals are directed by the mode multiplexer 240 a receiver 280n for amplification, detection, and data acquisition. A signal processor 282n (such as a computer, an oscilloscope) processes the acquired Rayleigh data and provides information that describes the distribution of vibration locations, amplitudes, and frequencies along the few mode fiber 250.

As a part of the processing of the Rayleigh data, the signal processors 282a-282n are configured to remove or reduce the effects of intermodal distortion upon the backscattered Rayleigh signals. In general, the distortive properties of the few mode fiber 250 can be identified and reversed in order to recover distortion-reduced versions of the Rayleigh signals. These processes will be discussed further in the descriptions of FIGS. 3-5.

In some embodiments, the receivers 280a-208n can include an optical amplifier. The Rayleigh traces can be amplified by the erbium-doped fiber amplifier, and the amplified spontaneous emission (ASE) noise of the amplified traces can be filtered out by a fiber Bragg grating. A photodetector can configured to convert light intensities into electrical signals. The filtered backscattered traces can be sensed by the photodetector, and the photodetector can provide representative electrical signals to an analog-to-digital (A/D) converter. The analog-to-digital converter can be configured to sample the electrical signals from the photodetector and provide representative digital data to the signal processors 282a-282n for further processing, presentation (for example, to a user), or both.

Figure 2B:
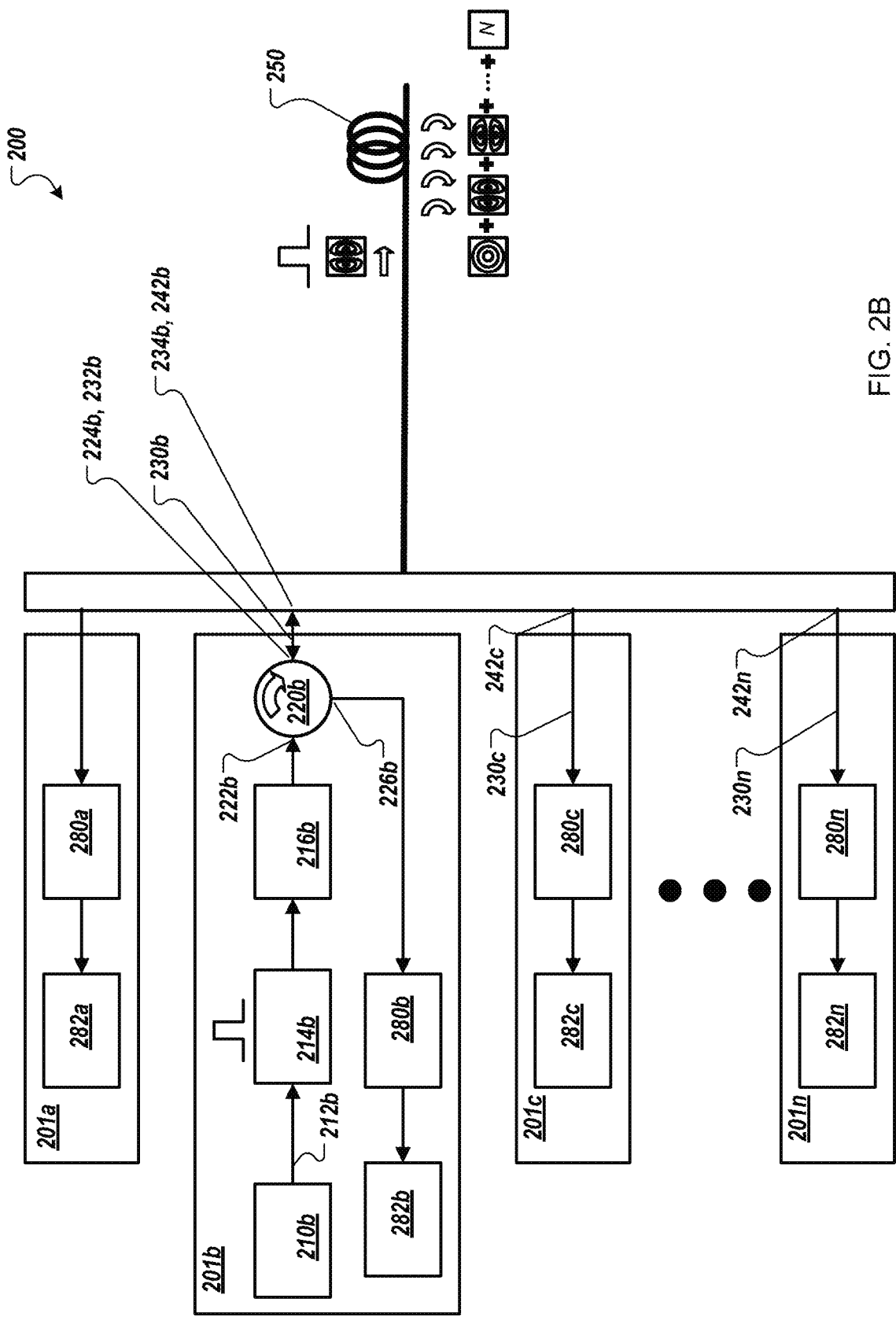

FIG. 2B is a block diagram that shows an example of the system 200 in a configuration that transmits light pulses and receives most of the backscattered Rayleigh signals using mode 2 of the few mode fiber 250.

The system 200 includes the light pulse assembly 201b. The light pulse assembly 201b has a configuration and use that is similar to the light pulse assembly 201a. A light source 210b of the light pulse assembly 201b emits continuous-wave (CW) light into a single mode fiber (SMF) 212b. The laser light is modulated by a modulator 214b to produce optical pulses.

The modulated light is amplified by an optical amplifier 216b. The amplified modulated light is provided to an optical port 222b of an optical circulator 220b. The optical circulator 220b provides the amplified modulated light to an optical port 224b that is optically coupled to a proximal end 232b of a single mode fiber 230b. In some embodiments in which the laser power is high enough to be used without amplification, the optical amplifier 216b may be omitted.

A distal end 234b of the single mode fiber 230b is optically coupled to the optical port 242b of a mode multiplexer (MUX) 240. In the illustrated example, mode multiplexer 240 is configured to couple the optical port 242b to mode 2 (two) of the few mode fiber 250.

The backscattered Rayleigh signal is directed by the few mode fiber 250 to the mode multiplexer 240. In the illustrated example, since the optical pulses were directed to mode 2 (two) of the few mode fiber 250, then most of the backscattered Rayleigh signals will be returned though mode 2, and as such the backscattered signals will be demultiplexed to the optical port 242b and the single mode fiber 230b.

To analyze the backscattered Rayleigh signal on mode 2 (two), the Rayleigh signals are directed by the optical circulator 220b to an optical port 226b that is optically coupled to a receiver 280b for amplification, detection, and data acquisition. A signal processor 282b (such as a computer, an oscilloscope) processes the acquired Rayleigh data and provides information that describes the distribution of vibration locations, amplitudes, and frequencies along the few mode fiber 250.

To analyze the backscattered Rayleigh signal on mode 1 (one), the Rayleigh signals are directed by the mode multiplexer 240 the receiver 280a for amplification, detection, and data acquisition. The signal processor 282a processes the acquired Rayleigh data and provides information that describes the distribution of vibration locations, amplitudes, and frequencies along the few mode fiber 250. To analyze the backscattered Rayleigh signal on mode 3 (three), the Rayleigh signals are directed by the mode multiplexer 240 the receiver 280c for amplification, detection, and data acquisition. The signal processor 282c processes the acquired Rayleigh data and provides information that describes the distribution of vibration locations, amplitudes, and frequencies along the few mode fiber 250. To analyze the backscattered Rayleigh signal on mode N, the Rayleigh signals are directed by the mode multiplexer 240 the receiver 280n for amplification, detection, and data acquisition. The signal processor 282n processes the acquired Rayleigh data and provides information that describes the distribution of vibration locations, amplitudes, and frequencies along the few mode fiber 250.

In either or both of the examples shown as FIGS. 2A and 2B, the system 200 can experience various amounts of intermodal distortion of light pulses and backscattered Rayleigh signals. This distortion can be caused by intermodal coupling among various modes of the few mode fiber 250.

In a first scenario, intermodal coupling can be negligible. This can be achieved through proper design of the few mode fiber 250. Since the fiber modes are orthogonal to each other, each mode would have its own Rayleigh interference signal apart from the other modes. When detecting the Rayleigh traces of the individual modes, each mode's trace could fully provide the desired vibration information. In such examples, typical signal processing algorithms, such as traces differences and Fourier transform, can be applied for the Rayleigh traces of each mode. In particular, in order to figure out a vibration location along the few mode fiber, the subsequent Rayleigh traces of each mode are subtracted in the time domain. If there are no vibrations, then the subtractions are ideally equal to zero; otherwise, the differences have values that change with time. Once the vibration location is identified, a Fourier transform can be applied at this position on the Rayleigh traces to calculate the frequency components of the vibration.

In a second scenario, intermodal coupling can be strong, such as when powers rapidly keep transferring among the modes within the few mode fiber 250. In such examples, the recorded modes' signals can become distorted and more advanced signal processing schemes can be implemented in order to extract the vibration information. A digital signal processing (DSP) process similar to multiple-input multiple output (MIMO) can be used to reduce or cancel the effect of intermodal coupling. In particular, MIMO calculates the transfer matrix that describes power transfers among different spatial modes along the few mode fiber. The individual elements of the transfer matrix are calculated via transmitting a training sequence of the modes into the few mode fiber and then measuring them after distortion. By inverting this transfer matrix, the impact of intermodal coupling can be compensated.

Assume that a FMF-based DAS system (such as the example system 100 of FIG. 1 or the example system 200 of FIGS. 2A and 2B) supports N modes. In such an example, $S_1, S_2, \ldots,$ and $S_N$ can represent Rayleigh signals after distortion by $Mode_1, Mode_2, \ldots,$ and $Mode_N$, respectively. These distorted signals can be represented using the following matrix form:

$$\begin{bmatrix} S_1 \\ S_2 \\ \ldots \\ S_N \end{bmatrix} = \begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix} \begin{bmatrix} S_{1o} \\ S_{2o} \\ \ldots \\ S_{No} \end{bmatrix} \quad \text{Equation 1}$$

where $S_{1O}, S_{2O}, \ldots,$ and $S_{NO}$ are respectively the original (undistorted) Rayleigh signals before distortion of $Mode_1, Mode_2, \ldots,$ and $Mode_N$, respectively. The complex coefficients $\Phi 11, \Phi 12, \ldots,$ and $a_{NN}$ represent distortion parameters that quantify the distortion elements produced by intermodal coupling within the few mode fiber.

Calculating the transfer matrix:

$$\begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}$$

and its inverse:

$$\begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}^{-1}$$

are performed similar to the MIMO approach. The individual elements of the transfer matrix are calculated via transmitting a training sequence of the modes into the few mode fiber and then measuring them after distortion. Next, the inverse of the transfer matrix can be mathematically calculated.

Afterwards, the original Rayleigh signals (before being distorted by the intermodal coupling) can be recovered by using the inverse transfer matrix and the distorted Rayleigh signals as follows:

$$\begin{bmatrix} S_{1o} \\ S_{2o} \\ \ldots \\ S_{No} \end{bmatrix} = \begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}^{-1} \begin{bmatrix} S_1 \\ S_2 \\ \ldots \\ S_N \end{bmatrix} \quad \text{Equation 2}$$

Two techniques for determining the distortion parameters $a_{11}, a_{12}, \ldots,$ and $a_{NN}$ will be described in more detail in subsequent paragraphs. One technique will be discussed in the description of FIG. 3. The other technique will be discussed in the description of FIG. 4.

Figure 3:
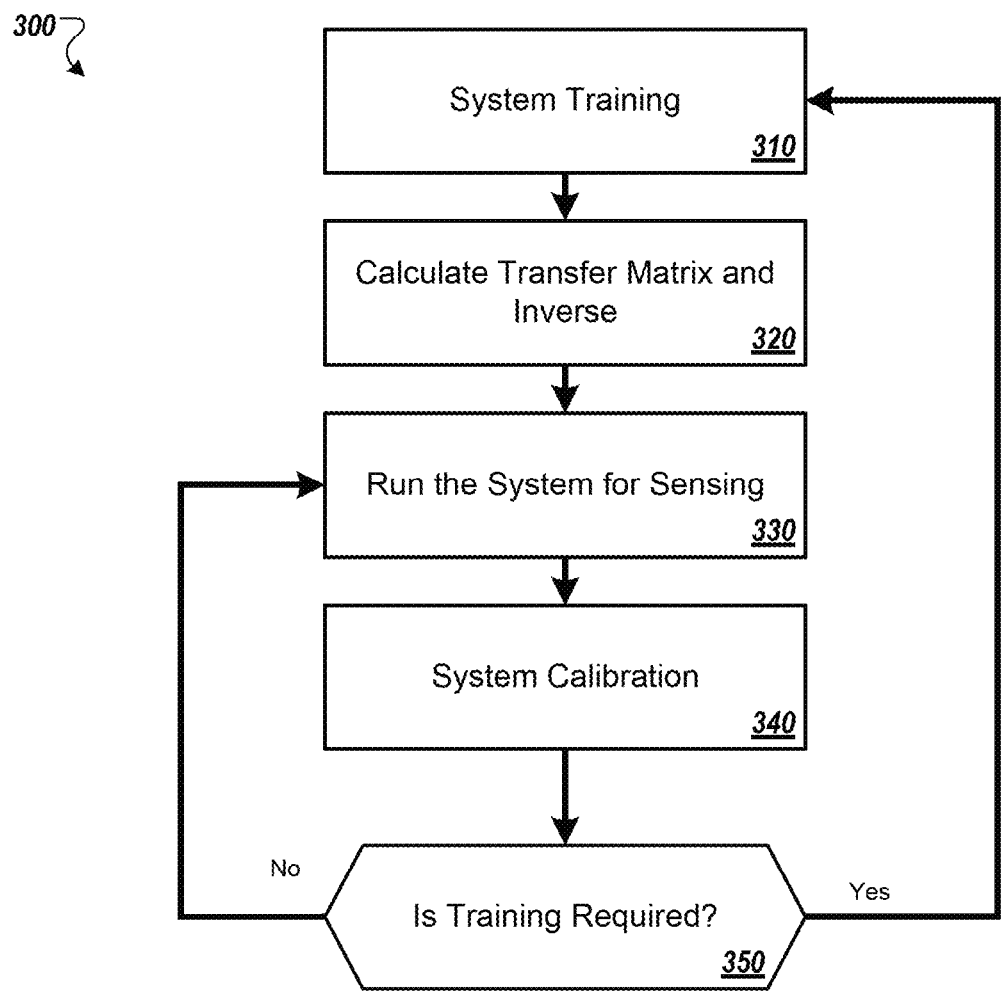
FIG. 3 is a flow diagram of an example process for determining intermodal distortion parameters.

FIG. 3 is a flow diagram of an example process 300 for determining intermodal distortion parameters. In some implementations, the process 300 can be used to determine intermodal distortion parameters of an optical fiber, such as the example fiber under test 130 of FIG. 1 or the example few mode fiber 250 of FIGS. 2A and 2B. In some implementations, the intermodal distortion parameters can be used to determine one or more substantially undistorted backscattered Rayleigh signals from one or more distorted backscattered Rayleigh signals (for example, distorted by less than 20%, 10%, 5%, 1%, or 0.1%). For example, the process 300 can be used to determine the distortion parameters $a_{11}, a_{12}, \ldots,$ and $a_{NN}$ used in Equation 1.

In FIG. 3, the system is trained 310 by sending a predetermined $S_{1O}, S_{2O}, \ldots,$ and $S_{NO}$ and measure the corresponding distorted ones $S_1, S_2, \ldots,$ and $S_N$. Substituting with the original and distorted signals into Equation 1, the transfer matrix and its inverse are calculated 320, which includes the elements $a_{11}, a_{12}, \ldots,$ and $a_{NN}$. Afterwards, the sensing system is run 330 and the distorted signals $S_1, S_2, \ldots,$ and $S_N$ are measured. Under these normal conditions, the $S_{1O}, S_{2O}, \ldots,$ and $S_{NO}$ are calculated using Equation 2. Next, the system is calibrated 340 to check whether the transfer matrix elements remain constants or have been changed. If, at 350, the transfer matrix elements are constants, the system continues to be run in normal conditions. Otherwise, the system is trained 310 again. This process is repeated until finishing our measurements.

Figure 4:
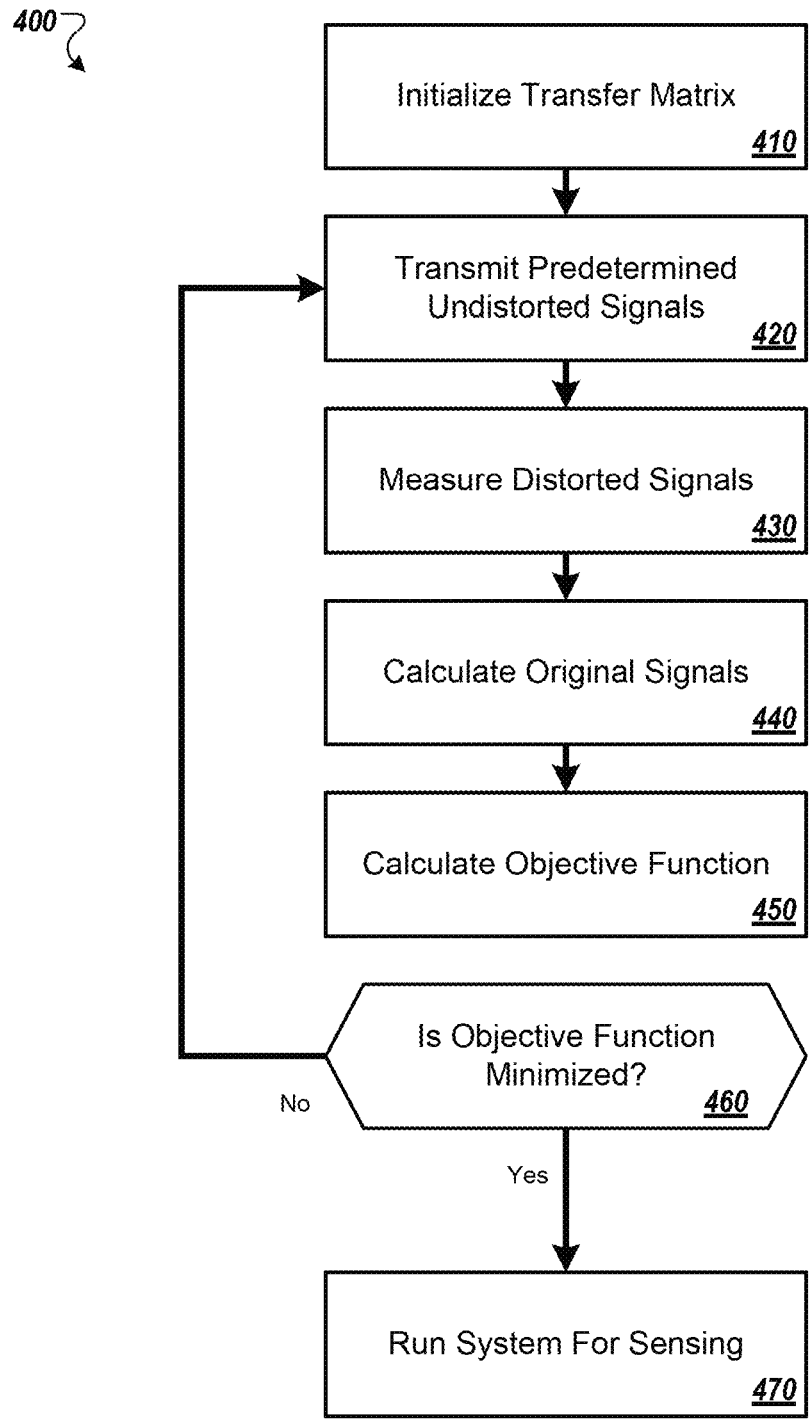
FIG. 4 is a flow diagram of another example process for determining intermodal distortion parameters.

FIG. 4 is a flow diagram of an example process 400 for determining intermodal distortion parameters. In some implementations, the process 400 can be used to determine intermodal distortion parameters of an optical fiber, such as the example fiber under test 130 of FIG. 1 or the example few mode fiber 250 of FIGS. 2A and 2B. In some implementations, the intermodal distortion parameters can be used to determine one or more substantially undistorted backscattered Rayleigh signals from one or more distorted backscattered Rayleigh signals. For example, the process 300 can be used to determine the distortion parameters $a_{11}$, $a_{12}$, ..., and $a_{NN}$ used in Equation 1.

At 410, the transfer matrix is initialized. An adaptive algorithm is used to measure the transfer matrix, which includes the elements $a_{11}$, $a_{12}$, ..., and $a_{NN}$. Initial values are assumed for the elements of the transfer matrix. Predetermined signals $S_{1O}$, $S_{2O}$, ..., and $S_{NO}$ are then transmitted 420. Next, the corresponding distorted signals $S_1$, $S_2$, ..., and $S_N$ are measured 430. Using Equation 1, the original signals $S_{1O}$, $S_{2O}$, ..., and $S_{NO}$ are calculated 440. Afterwards, an objective function is calculated 450, which is defined as the difference between the predetermined transmitted signals and the calculated ones. If at 460 the objective function is minimized, the sensing system is run at 470. Otherwise, the elements of the transfer matrix are modified. The process 400 ends when finishing the sensing measurements.

Figure 5:
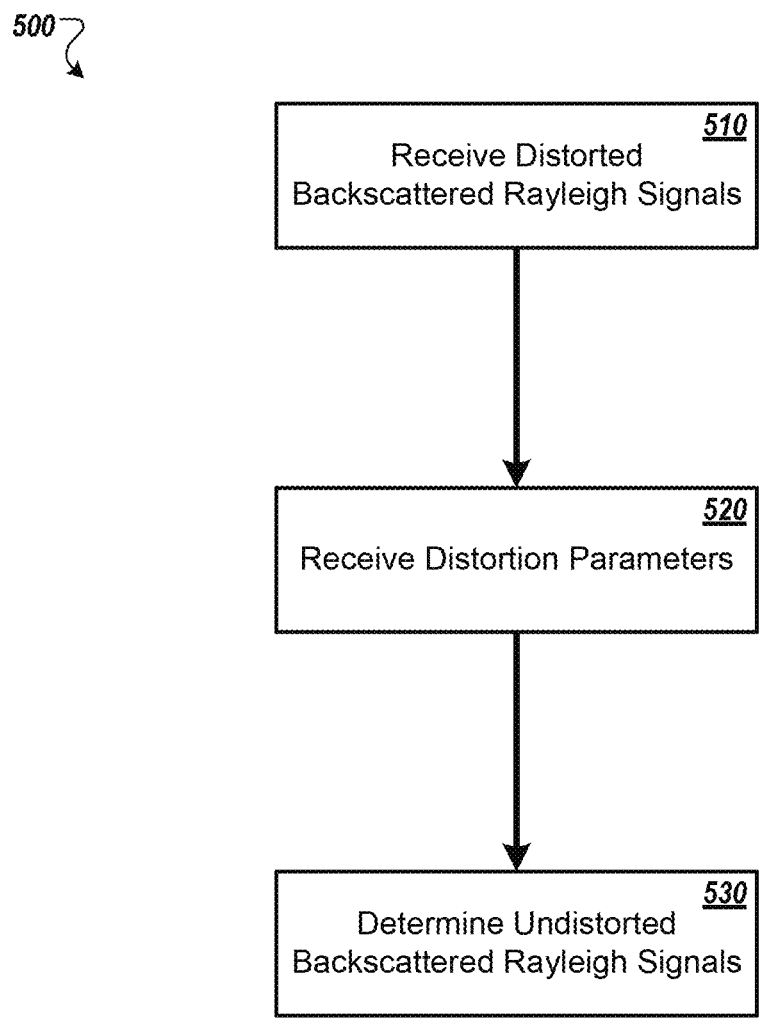
FIG. 5 is a flow diagram of an example process for determining one or more substantially undistorted backscattered Rayleigh signals from one or more distorted backscattered Rayleigh signals.

FIG. 5 is a flow diagram of an example process 500 for determining one or more substantially undistorted backscattered Rayleigh signals from one or more distorted backscattered Rayleigh signals. In some implementations, the process 500 can be performed by all or parts of the example system 100 of FIG. 1 or the example system 200 of FIGS. 2A and 2B. In some implementations of the process 500, the optical fiber can be a few mode fiber (FMF). For example, the system 200 includes the few mode fiber 250. For example, the computing system 110 or the signal processors 282a-282n perform the process 500 to reduce or remove intermodal distortion from backscattered Rayleigh signals received from the fiber under test 120 or the few mode fiber 250.

At 510, a collection of distorted backscattered Rayleigh signals are received from a collection of modes of an optical fiber, where the collection of distorted backscattered Rayleigh signals are distorted by an intermodal coupling among the collection of modes. For example, the signal processors 282a-282n can receive distorted backscattered Rayleigh signals from the few mode fiber 250, in which the signals are distorted due to intermodal coupling among various modes of the few mode fiber 250.

At 520, a collection of distortion parameters that are descriptive of distortion effects of the intermodal coupling are received. For example, one or more of the signal processors 282a-282n can receive the distortion parameters $a_{11}$, $a_{12}$, ..., and $a_{NN}$.

In some implementations, receiving the collection of distortion parameters that are descriptive of distortion effects of the intermodal coupling can include transmitting a collection of training symbols as a collection of optical pulses through the optical fiber, receiving a collection of training backscattered Rayleigh signals from the collection of modes of the optical fiber, where the collection of training backscattered Rayleigh signals are distorted by the intermodal coupling among the collection of modes, comparing the collection of received training backscattered Rayleigh signals to a collection of predetermined undistorted backscattered Rayleigh signals, determining, based on the comparing, a collection of determined distortion parameters, and providing the collection of determined distortion parameters as the collection of distortion parameters. For example, the computing system 100 can perform the example process 300 of FIG. 3. For example, an adaptive algorithm can be used to measure the transfer matrix elements $a_{11}$, $a_{12}$, ..., and $a_{NN}$; assuming initial values for the elements of the transfer matrix. Predetermined undistorted signals $S_{1O}$, $S_{2O}$, ..., and $S_{NO}$ can be transmitted, and the corresponding distorted signals $S_1$, $S_2$..., and $S_N$ can be received and measured. The original signals ($S_{1O}$, $S_{2O}$, ..., and $S_{NO}$) can be determined using Equation 1, and an objective function can be determined which is defined as the difference between the predetermined transmitted signals and the calculated ones. The sensing system can be run, and the objective function can be minimized. Otherwise, the elements of the transfer matrix can be modified, and some or all of the process can be repeated, for example, until the measurement sensing is finished.

In some implementations, the system can be trained by sending predetermined signals $S_{1O}$, $S_{2O}$, ..., and $S_{NO}$ and measuring their corresponding distorted signals $S_1$, $S_2$, ..., and $S_N$; substituting with the original and distorted signals into Equation 1 and calculating the transfer matrix and its inverse which includes $a_{11}$, $a_{12}$, ..., and $a_{NN}$; running the sensing system and measuring only the distorted signals $S_1$, $S_2$, ..., and $S_N$; calculating the original signals ($S_{1O}$, $S_{2O}$, ..., and $S_{NO}$) using Equation 2, calibrating our system to check whether the transfer matrix elements remain constants or have been changed. The system can continue to run in normal conditions, conditioning that the transfer matrix elements are constants. Otherwise, the system can be trained again, repeating the process until the measurement sensing is finished.

In some implementations, receiving the collection of distortion parameters that are descriptive of distortion effects of the intermodal coupling can include receiving a collection of first distortion parameters, transmitting a collection of optical pulses through the optical fiber, measuring the received collection of distorted backscattered Rayleigh signals, determining, based on the measuring, a collection of second distortion parameters, and providing the collection of second distortion parameters as the collection of distortion parameters that are descriptive of distortion effects of the intermodal coupling. For example, the computing system 100 can perform the example process 400 of FIG. 4.

At 530, an undistorted backscattered Rayleigh signal is determined based on the collection of distorted backscattered Rayleigh signals and the collection of distortion parameters. For example, the computing system 100 can determine one or more Rayleigh signals in which the effects of intermodal distortion are reduced or eliminated.

In some implementations, the process 500 can also include determining at least one transformed Rayleigh signal by removing distortion caused by intermodal coupling from at least one of the distorted backscattered Rayleigh signals, based on the distorted backscattered Rayleigh signals and the collection of distortion parameters, where the collection of distorted backscattered Rayleigh signals are backscattered by a vibration of the optical fiber at a vibration frequency and a vibration amplitude at a vibration location along the optical fiber, determining, based on the transformed Rayleigh signal, at least one of the vibration location, the vibration frequency, and the vibration amplitude, and providing the determined at least one of the vibration location, the vibration frequency, and the vibration amplitude. For example, the location, frequency, and amplitude of the vibrations 152 can be determined by the computing system 110.

In some implementations, the process 500 can include transmitting a collection of optical pulses through a selected mode of an optical fiber, where receiving the collection of distorted backscattered Rayleigh signals from the collection of modes of the optical fiber, where the collection of distorted backscattered Rayleigh signals are distorted by an intermodal coupling among the collection of modes can include separating, by a mode demultiplexer, first backscattered Rayleigh signals from a selected mode of the optical fiber based on a vibration of the optical fiber at a vibration frequency and a vibration amplitude at a vibration location along the optical fiber, and separating, by the mode demultiplexer, second backscattered Rayleigh signals from another selected mode of the optical fiber based on the vibration of the optical fiber. For example, the light pulse assembly 201b can inject light pulses on mode 2 of the few mode fiber 250, and receive backscattered Rayleigh signals on one or more of modes 1-n of the few mode fiber 250.

In some implementations, the process 500 can also include comparing the first backscattered Rayleigh signals and the second backscattered Rayleigh signals, and determining, based on the comparing, an amount of intermodal coupling between the first mode and the second mode. In some implementations, the comparing can include detecting differences between the first backscattered Rayleigh signals and the second backscattered Rayleigh signals. In particular, in order to figure out a vibration location along the few mode fiber, subsequent Rayleigh traces of each mode are subtracted in the time domain. If there are no vibrations, the subtractions are ideally equal to zero; otherwise, the differences have values that change with time. Once the vibration location is located, we apply Fourier transform at this position on the Rayleigh traces to calculate the frequency components of the vibration. For example, in order to figure out a vibration location along the few mode fiber, subsequent Rayleigh traces of each mode can be subtracted in the time domain. If there are no vibrations, the subtractions are ideally equal to zero. Otherwise, the differences have values that change with time. Once the vibration location is identified, a Fourier transform can be applied at this position on the Rayleigh traces to calculate the frequency components of the vibration.

In some implementations, the comparing can include applying a Fourier transform to the first backscattered Rayleigh signals and the second backscattered Rayleigh signals. In particular, in order to figure out a vibration location along the few mode fiber, the subsequent Rayleigh traces of each mode are subtracted in the time domain. If there are no vibrations, the subtractions are ideally equal to zero; otherwise, the differences have values that change with time. Once the vibration location is located, a Fourier transform can be applied at this position on the Rayleigh traces to calculate the frequency components of the vibration.

In some implementations, the process 500 can also include receiving a collection of distorted backscattered Rayleigh signals from a collection of modes of an optical fiber, where the collection of distorted backscattered Rayleigh signals are distorted by an intermodal coupling among the collection of modes can include receiving a first distorted backscattered Rayleigh signal $S_1$ from a mode 1 of the optical fiber, receiving a second distorted backscattered Rayleigh signal $S_2$ from a mode 2 of the optical fiber, . . . , and receiving an $N^{th}$ distorted backscattered Rayleigh signal $S_N$ from a mode N of the optical fiber, receiving a collection of distortion parameters that are descriptive of distortion effects of the intermodal coupling can also include receiving a distortion parameter $a_{11}$, receiving a distortion parameter $a_{12}$, . . . , and receiving a distortion parameter $a_{NN}$, determining an undistorted backscattered Rayleigh signal based on the collection of distorted backscattered Rayleigh signals and the collection of distortion parameters can include determining a first undistorted Rayleigh signal $S_{1o}$ of the first mode, determining a second undistorted Rayleigh signal $S_{2o}$ of the second mode, . . . , and determining a third undistorted Rayleigh signal $S_{No}$ of the third mode, where $S_{1o}, S_{2o}, \ldots,$ and $S_{No}$ are determined based on Equation 1.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer readable media (transitory or non-transitory, as appropriate) suitable for storing computer program instructions and data includes all forms of permanent/non-permanent or volatile/nonvolatile memory, media and memory devices, including by way of example semiconductor memory devices, for example, random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto optical disks; and optical memory devices, for example, digital video disc (DVD), CD ROM, DVD+/-R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references to them. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a collection of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in this context can be any file system type accessible from multiple servers for read and update. Locking or consistency tracking is not necessary in this context since the locking of exchange file system can be done at application layer. Furthermore, Unicode data files are different from non-Unicode data files.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Although a few implementations have been described in detail in the previous paragraphs, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A vibration sensor system comprising:
   a light pulse generator configured to provide a plurality of optical pulses;
   an optical fiber having a plurality of modes and a predetermined length and configured to guide the optical pulses; and
   a sensor optically coupled to the optical fiber and configured to determine a location and frequency of a vibration of the optical fiber at a location along the optical fiber, based on a collection of distortion parameters that are descriptive of intermodal distortion effects of intermodal coupling within the optical fiber, wherein determining the location and frequency comprises:
      receiving a plurality of distorted backscattered Rayleigh signals from the optical fiber, wherein the plurality of distorted backscattered Rayleigh signals are based on an original backscattered Rayleigh signal backscattered by a vibration of the optical fiber at a vibration frequency and a vibration amplitude at a vibration location along the optical fiber and distorted by intermodal coupling among the plurality of modes; and
      transforming, by a processor, the plurality of distorted backscattered Rayleigh signals into an undistorted backscattered Rayleigh signal based on the collection of distortion parameters, wherein the undistorted backscattered Rayleigh signal is substantially a recovered version of the original backscattered Rayleigh signal.

2. The vibration sensor system of claim 1, wherein the light pulse generator comprises:
   a light source configured to generate continuous-wave light;
   a first optical modulator configured to convert the continuous-wave light into the plurality of optical pulses having a predetermined frequency;
   an optical amplifier configured to amplify the plurality of optical pulses; and
   an optical circulator having a first port configured to receive the optical pulses and provide the optical pulses to a second port that is optically coupled to the optical fiber, wherein the second port is also configured to receive backscattered Rayleigh traces and provide the backscattered Rayleigh traces to a third port that is in optical communication with the sensor.

3. The vibration sensor system of claim 1, further comprising receiving, by the processor, the collection of distortion parameters that are descriptive of intermodal distortion effects of intermodal coupling.

4. The vibration sensor system of claim 3, wherein receiving, by the processor, a collection of distortion parameters that are descriptive of distortion effects of intermodal coupling comprises:
   transmitting a plurality of training symbols as a plurality of optical pulses through the optical fiber;

receiving a plurality of training backscattered Rayleigh signals from the plurality of modes of the optical fiber, wherein the plurality of training backscattered Rayleigh signals are distorted by intermodal coupling among the plurality of modes;

comparing the received plurality of training backscattered Rayleigh signals to a plurality of predetermined undistorted backscattered Rayleigh signals;

determining, based on the comparing, a collection of determined intermodal distortion parameters; and providing the collection of determined intermodal distortion parameters as the collection of intermodal distortion parameters.

5. The vibration sensor system of claim 3, wherein receiving, by the processor, a collection of intermodal distortion parameters that are descriptive of distortion effects of intermodal coupling comprises:

receiving a collection of first intermodal distortion parameters;

transmitting a plurality of optical pulses through the optical fiber;

measuring the received plurality of distorted backscattered Rayleigh signals;

determining, based on the measuring, a collection of second intermodal distortion parameters; and providing the collection of second intermodal distortion parameters as the collection of intermodal distortion parameters that are descriptive of distortion effects of intermodal coupling.

6. The vibration sensor system of claim 3, wherein:

receiving a plurality of distorted backscattered Rayleigh signals from a plurality of modes of the optical fiber, wherein the plurality of distorted backscattered Rayleigh signals are distorted by intermodal coupling among the plurality of modes comprises:

receiving a first distorted backscattered Rayleigh signal $S_1$ from a mode 1 of the optical fiber;

receiving a second distorted backscattered Rayleigh signal $S_2$ from a mode 2 of the optical fiber; and receiving a third distorted backscattered Rayleigh signal $S_N$ from a mode N of the optical fiber;

receiving a collection of distortion parameters that are descriptive of distortion effects of intermodal coupling further comprises:

receiving a distortion parameter $a_{11}$;

receiving a distortion parameter $a_{12}$; and receiving a distortion parameter $a_{NN}$; and determining an undistorted backscattered Rayleigh signal based on the plurality of distorted backscattered Rayleigh signals and the collection of distortion parameters comprises:

determining a first undistorted Rayleigh signal $S_{1o}$ of the mode 1;

determining a second undistorted Rayleigh signal $S_{2o}$ of the mode 2; and determining a third undistorted Rayleigh signal $S_{No}$ of the mode N, wherein $S_{1o}$, $S_{2o}$, and $S_{No}$ are determined as:

$$\begin{bmatrix} S_{1o} \\ S_{2o} \\ \ldots \\ S_{No} \end{bmatrix} = \begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}^{-1} \begin{bmatrix} S_1 \\ S_2 \\ \ldots \\ S_N \end{bmatrix}.$$

7. The vibration sensor system of claim 1, wherein the determining further comprises determining at least one of the vibration location and the vibration frequency of the vibration of the optical fiber at the vibration location along the optical fiber, based on the undistorted backscattered Rayleigh signal.

8. The vibration sensor system of claim 1, wherein the transforming further comprises determining at least one transformed Rayleigh signal by removing intermodal distortion caused by intermodal coupling from at least one of the distorted backscattered Rayleigh signals, based on the distorted backscattered Rayleigh signals and the collection of intermodal distortion parameters.

9. The vibration sensor system of claim 8, wherein the determining further comprises:

determining, based on the transformed Rayleigh signal, at least one of the vibration location, the vibration frequency, and the vibration amplitude; and providing the determined at least one of the vibration location, the vibration frequency, and the vibration amplitude.

10. The vibration sensor system of claim 1, wherein the determining further comprises:

receiving a collection of first intermodal distortion parameters;

transmitting a plurality of optical pulses through the optical fiber;

measuring the received plurality of distorted backscattered Rayleigh signals;

determining, based on the measuring, a collection of second intermodal distortion parameters; and providing the collection of second intermodal distortion parameters as the collection of intermodal distortion parameters that are descriptive of intermodal distortion effects of intermodal coupling.

11. The vibration sensor system of claim 1, wherein:

the determining further comprises transmitting a plurality of optical pulses through a selected mode of the optical fiber; and receiving a plurality of distorted backscattered Rayleigh signals from the optical fiber, wherein the plurality of distorted backscattered Rayleigh signals are based on an original backscattered Rayleigh signal backscattered by a vibration of the optical fiber at a vibration frequency and a vibration amplitude at a vibration location along the optical fiber and distorted by intermodal coupling among the plurality of modes comprises:

separating, by a mode demultiplexer, first backscattered Rayleigh signals from a selected mode A of the optical fiber based on a vibration of the optical fiber at a vibration frequency and a vibration amplitude at a vibration location along the optical fiber; and separating, by the mode demultiplexer, second backscattered Rayleigh signals from a selected mode B of the optical fiber based on the vibration of the optical fiber.

12. The vibration sensor system of claim 11, wherein the determining further comprises:

comparing the first backscattered Rayleigh signals and the second backscattered Rayleigh signals; and determining, based on the comparing, an amount of intermodal coupling between the selected mode A and the selected mode B.

13. The vibration sensor system of claim 12, wherein the determining further comprises detecting differences between the first backscattered Rayleigh signals and the second backscattered Rayleigh signals.

14. The vibration sensor system of claim 12, wherein the determining further comprises applying a Fourier transform to the first backscattered Rayleigh signals and the second backscattered Rayleigh signals.

15. The vibration sensor system of claim 1, wherein the optical fiber is a few mode optical fiber.

16. A method for removing intermodal distortion, comprising:
receiving a plurality of distorted backscattered Rayleigh signals from a plurality of modes of an optical fiber, wherein the plurality of distorted backscattered Rayleigh signals are based on an original backscattered Rayleigh signal backscattered by a vibration of the optical fiber at a vibration frequency and a vibration amplitude at a vibration location along the optical fiber and distorted by intermodal coupling among the plurality of modes;
receiving a collection of distortion parameters that are descriptive of distortion effects of intermodal coupling; and
transforming the plurality of distorted backscattered Rayleigh signals into an undistorted backscattered Rayleigh signal based on the plurality of distorted backscattered Rayleigh signals and the collection of distortion parameters, wherein the undistorted backscattered Rayleigh signal is substantially a recovered version of the original backscattered Rayleigh signal.

17. The method of claim 16, wherein:
receiving a plurality of distorted backscattered Rayleigh signals from a plurality of modes of an optical fiber, wherein the plurality of distorted backscattered Rayleigh signals are based on an original backscattered Rayleigh signal backscattered by a vibration of the optical fiber at a vibration frequency and a vibration amplitude at a vibration location along the optical fiber and distorted by intermodal coupling among the plurality of modes comprises:
receiving a first distorted backscattered Rayleigh signal $S_1$ from a mode 1 of the optical fiber;
receiving a second distorted backscattered Rayleigh signal $S_2$ from a mode 2 of the optical fiber; and
receiving a third distorted backscattered Rayleigh signal $S_N$ from a mode N of the optical fiber;
receiving a collection of distortion parameters that are descriptive of distortion effects of intermodal coupling further comprises:
receiving a distortion parameter $a_{11}$;
receiving a distortion parameter $a_{12}$; and
receiving a distortion parameter $a_{NN}$; and
determining an undistorted backscattered Rayleigh signal based on the plurality of distorted backscattered Rayleigh signals and the collection of distortion parameters comprises:
determining a first undistorted Rayleigh signal $S_{1o}$ of the mode 1;
determining a second undistorted Rayleigh signal $S_{2o}$ of the mode 2; and
determining a third undistorted Rayleigh signal $S_{No}$ of the mode N,
wherein $S_{1o}$, $S_{2o}$, and $S_{No}$ are determined as:

$$\begin{bmatrix} S_{1o} \\ S_{2o} \\ \ldots \\ S_{No} \end{bmatrix} = \begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}^{-1} \begin{bmatrix} S_1 \\ S_2 \\ \ldots \\ S_N \end{bmatrix}.$$

18. A non-transitory computer storage medium encoded with a computer program, the computer program comprising instructions that when executed by data processing apparatus cause a data processing apparatus to perform operations comprising:
receiving a plurality of distorted backscattered Rayleigh signals from a plurality of modes of an optical fiber, wherein the plurality of distorted backscattered Rayleigh signals are based on an original backscattered Rayleigh signal backscattered by a vibration of the optical fiber at a vibration frequency and a vibration amplitude at a vibration location along the optical fiber and distorted by intermodal coupling among the plurality of modes;
receiving a collection of distortion parameters that are descriptive of distortion effects of intermodal coupling; and
transforming the plurality of distorted backscattered Rayleigh signals into an undistorted backscattered Rayleigh signal based on the collection of distortion parameters, wherein the undistorted backscattered Rayleigh signal is substantially a recovered version of the original backscattered Rayleigh signal.

19. The non-transitory computer storage medium of claim 18, the operations further comprising:
receiving a plurality of distorted backscattered Rayleigh signals from a plurality of modes of the optical fiber, wherein the plurality of distorted backscattered Rayleigh signals are distorted by intermodal coupling among the plurality of modes comprises:
receiving a first distorted backscattered Rayleigh signal $S_1$ from a mode 1 of the optical fiber;
receiving a second distorted backscattered Rayleigh signal $S_2$ from a mode 2 of the optical fiber; and
receiving a third distorted backscattered Rayleigh signal $S_N$ from a mode N of the optical fiber;
receiving a collection of distortion parameters that are descriptive of distortion effects of intermodal coupling further comprises:
receiving a distortion parameter $a_{11}$;
receiving a distortion parameter $a_{12}$; and
receiving a distortion parameter $a_{NN}$, and
determining an undistorted backscattered Rayleigh signal based on the plurality of distorted backscattered Rayleigh signals and the collection of distortion parameters comprises:
determining a first undistorted Rayleigh signal $S_{1o}$ of the mode 1;
determining a second undistorted Rayleigh signal $S_{2o}$ of the mode 2; and
determining a third undistorted Rayleigh signal $S_{No}$ of the mode N,
wherein $S_{1o}$, $S_{2o}$, and $S_{No}$ are determined as:

$$\begin{bmatrix} S_{1o} \\ S_{2o} \\ \ldots \\ S_{No} \end{bmatrix} = \begin{bmatrix} a_{11} & a_{12} & \ldots & a_{1N} \\ a_{21} & a_{22} & \ldots & a_{2N} \\ \ldots & \ldots & \ldots & \ldots \\ a_{N1} & a_{N2} & \ldots & a_{NN} \end{bmatrix}^{-1} \begin{bmatrix} S_1 \\ S_2 \\ \ldots \\ S_N \end{bmatrix}.$$

* * * * *